(12) United States Patent
Zhang et al.

(10) Patent No.: US 9,924,168 B2
(45) Date of Patent: Mar. 20, 2018

(54) METHOD AND APPARATUS OF MOTION VECTOR DERIVATION 3D VIDEO CODING

(71) Applicant: HFI INNOVATION INC., Zhubei, Hsinchu County (TW)

(72) Inventors: Kai Zhang, Beijing (CN); Jicheng An, Beijing (CN)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 315 days.

(21) Appl. No.: 14/433,328

(22) PCT Filed: Sep. 2, 2013

(86) PCT No.: PCT/CN2013/082800
§ 371 (c)(1),
(2) Date: Apr. 2, 2015

(87) PCT Pub. No.: WO2014/053086
PCT Pub. Date: Apr. 10, 2014

(65) Prior Publication Data
US 2015/0264347 A1    Sep. 17, 2015

Related U.S. Application Data

(60) Provisional application No. 61/710,064, filed on Oct. 5, 2012.

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/176* (2014.11);
(Continued)

(58) Field of Classification Search
None
See application file for complete search history.

(56) References Cited

U.S. PATENT DOCUMENTS

2008/0089428 A1* 4/2008 Nakamura ........... H04N 19/597
  375/240.26
2012/0230408 A1    9/2012 Zhou
(Continued)

FOREIGN PATENT DOCUMENTS

| CN | 102946535 | 2/2013 |
|----|-----------|--------|
| WO | WO 2012/099692 A1 | 7/2012 |
| WO | WO 2012/171442 | 12/2012 |

OTHER PUBLICATIONS

Schwarz, H., et al.; "Description of 3D Video Coding Technology Proposal by Fraunhofer HHI (HEVC compatible; configuration A);" International Organisation for Standardisation; Nov. 2011; pp. 1-46.
(Continued)

*Primary Examiner* — Kate Luo
(74) *Attorney, Agent, or Firm* — McClure, Qualey & Rodack, LLP (57) ABSTRACT

A method and apparatus for three-dimensional and multi-view video coding are disclosed, where the motion vector (MV) or disparity vector (DV) candidate list construction process for a block depends on whether the target reference picture corresponds to an inter-view reference picture or whether the inter-view candidate refers to an inter-view reference picture. In one embodiment, an MV or DV candidate list for a block coded in Merge mode is constructed, and an inter-view candidate in the MV or DV candidate list is set lower than the first candidate position if the inter-view candidate refers to an inter-view reference picture. In another embodiment, an MV or DV candidate list for a block coded in advanced motion vector prediction mode is constructed, and an inter-view candidate is set lower than the (Continued)

first candidate position if the inter-view candidate refers to an inter-view reference picture.

8 Claims, 8 Drawing Sheets

(51) Int. Cl.
  *H04N 19/597* (2014.01)
  *H04N 19/176* (2014.01)
  *H04N 19/52* (2014.01)
  *H04N 19/527* (2014.01)
(52) U.S. Cl.
  CPC ........... *H04N 19/52* (2014.11); *H04N 19/597* (2014.11); *H04N 19/527* (2014.11)

(56) References Cited

U.S. PATENT DOCUMENTS

2012/0269269 A1* 10/2012 Choi .................... H04N 19/597
  375/240.16
2013/0335526 A1* 12/2013 Lee ...................... H04N 19/597
  348/43

OTHER PUBLICATIONS

Bartnik, C., et al.; "HEVC Extension for Multiview Video Coding and Multiview Video plus Depth Coding;" ITU-Telecommunications Standardization Sector; Feb. 2012; pp. 1-42.

Sung, J., et al.; "3D-HEVC-CE3 Results on Multi-view Motion Information Reuse Method;" International Organisation for Standardisation; Feb. 2012; pp. 1-4.

Lee, J.Y., et al.; "3D-CE5.h related results on inter-view motion vector candidate construction in merge and AMVP modes;" Joint Collaborative Team on 3D Video Coding Extension Development of ITU-T SG 16 and IST/IEC JTC 1/SC 29/WG 11; Oct. 2012; pp. 1-2.

International Search Report dated Dec. 12, 2013, issued in PCT/CN2013/082800.

Schwarz, H., et al.; "Inter-View Prediction of Motion Data in Multiview Video Coding;" 2012 Picture Coding Symposium, May 9, 2012; pp. 101-104.

Sung, J., et al.; "3D-CE5.h: Simplification of disparity vector derivation for HEVC-based 3D video coding;" Joint Collaborative Team on 3D Video Coding Extension Development of ITU-T SG 16 WP 3 and ISO/IEC JTC 1/SC 29/WG 11; Jul. 2012; pp. 1-4.

\* cited by examiner

METHOD AND APPARATUS OF MOTION VECTOR DERIVATION 3D VIDEO CODING

CROSS REFERENCE TO RELATED APPLICATIONS

The present invention is a National Stage of PCT/CN2013/082800, filed on Sep. 2, 2013, which claims priority to U.S. Provisional Patent Application Ser. No. 61/710,064, filed on Oct. 5, 2012, entitled "Improvements on MV Candidates". The priority applications are hereby incorporated by reference in their entirety.

FIELD OF INVENTION

The present invention relates to video coding. In particular, the present invention relates to motion vector candidate list derivation for advanced motion vector prediction (AMVP) and Merge mode in three-dimensional video coding and multi-view video coding.

BACKGROUND OF THE INVENTION

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit. Therefore, multi-view video coding techniques have been developed in the field to reduce the required storage space and the transmission bandwidth. A straightforward approach may simply apply conventional video coding techniques to each single-view video sequence independently and disregard any correlation among different views. Such straightforward techniques would result in poor coding performance. In order to improve multi-view video coding efficiency, multi-view video coding always exploits inter-view redundancy. The disparity between two views is caused by the locations and angles of the two respective cameras.

For 3D video, in addition to the conventional texture data associated with multiple views, depth data is often captured or derived as well. The depth data may be captured for video associated with one view or multiple views. The depth information may also be derived from images of different views. The depth data may be represented in lower spatial resolution than the texture data. The depth information is useful for view synthesis and inter-view prediction.

Figure 1:
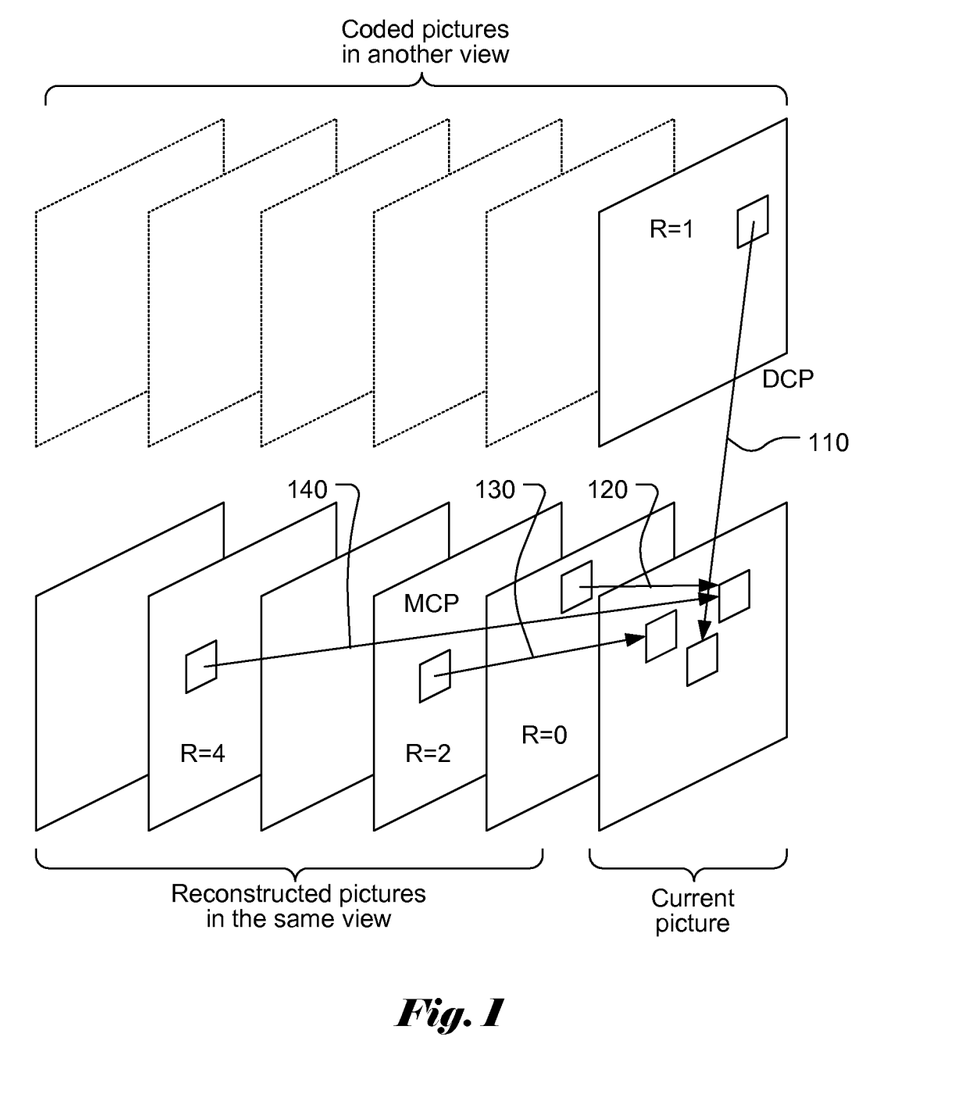
FIG. 1 illustrates an example of three-dimensional coding or multi-view coding, where both motion-compensated prediction and disparity-compensated prediction are used.

To share the previously coded texture information of adjacent views, a technique known as disparity-compensated prediction (DCP) has been included in the HTM (High Efficiency Video Coding (HEVC)-based Test Model) software test platform as an alternative to motion-compensated prediction (MCP). MCP refers to Inter-picture prediction that uses previously coded pictures of the same view, while DCP refers to an Inter-picture prediction that uses previously coded pictures of other views in the same access unit. FIG. 1 illustrates an example of 3D video coding system incorporating MCP and DCP. The vector (110) used for DCP is termed as disparity vector (DV), which is analog to the motion vector (MV) used in MCP. FIG. 1 illustrates three MVs (120, 130 and 140) associated with MCP. Moreover, the DV of a DCP block can also be predicted by the disparity vector predictor (DVP) candidate derived from neighboring blocks or the temporal collocated blocks that also use inter-view reference pictures.

Figure 2:
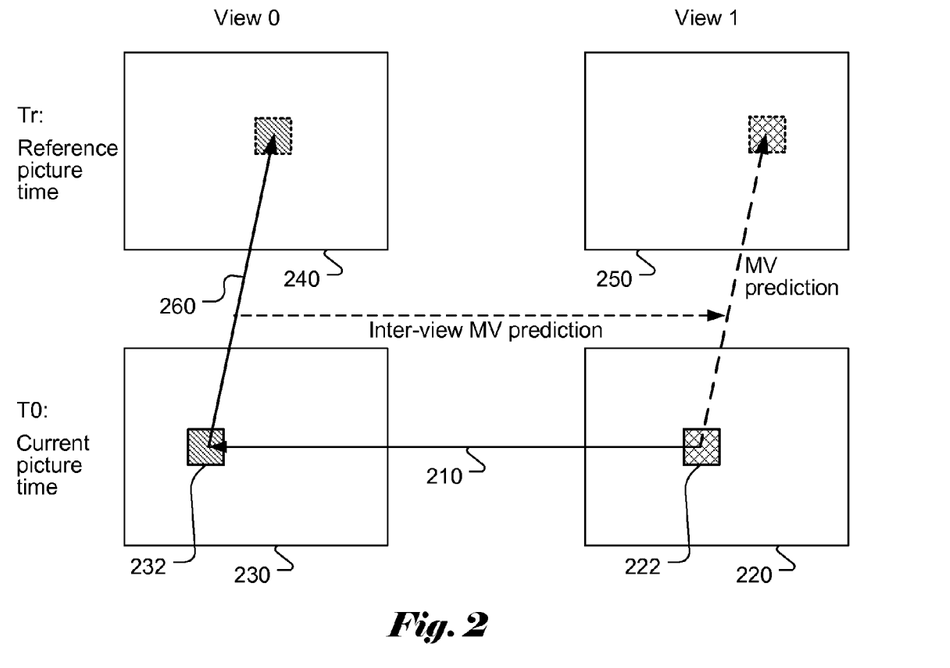
FIG. 2 illustrates an example of derivation process for inter-view motion prediction based on an estimated disparity vector.

The derivation of inter-view motion prediction is illustrated in FIG. 2. An estimated disparity vector 210 (DV) is derived for the current block (222) in the current picture (220). The estimated DV (210) is used along with the current block (222) to locate the corresponding block (232) in the base-view picture (230) by combining the position of the current block and the estimated DV. A condition is checked to determine whether the corresponding block (232) is Inter-coded and the Picture Order Count (POC) of the reference picture (240) is in the reference lists of the current block (222). If the existence condition is true, the MV (260) of the corresponding block (232) will be provided as the inter-view motion prediction for the current block (222), where the MV (260) of the corresponding block (232) is used by the current block (222) to point to a reference picture (250) in the same view as the current picture (220). Otherwise, the estimated DV itself (with vertical component set to zero) can be regarded as a 'Motion Vector Prediction (MVP)', which is actually DV Prediction (DVP).

The estimated DV plays a critical role in the process of inter-view motion prediction. In the conventional HTM, the estimated DV is derived by checking whether spatial or temporal neighboring blocks have any available DV. If so, an available DV will be used as the estimated DV for the current block. If none of the neighboring blocks has any available DV, the conventional HTM adopts a technique, named DV-MCP (Disparity Vector-Motion Compensated Prediction) to provide an estimated DV. The DV-MCP technique determines the estimated DV based on the depth map of the current block. If the DV-MCP method also fails to find an estimated DV, a zero DV is used as the default DV.

In HTM, Merge mode is provided for Inter coded block to allow the block to be "merged" with a neighboring block. For a selected block coded in Merge mode, the motion information can be determined from the coded neighboring blocks. A set of possible candidates in Merge mode comprises spatial neighbor candidates and a temporal candidate. Index information is transmitted to select one out of several available candidates. Therefore, only residual information for the selected block needs to send. Skip mode is similar to Merge mode where no motion information needs to be explicitly transmitted. For a block coded in Skip mode, there is also no need to explicitly transmit the residual information. The residual information can be inferred as default values, such as zero. In general, there are two types of Inter-coded blocks: Merge and non-Merge. When an Inter-coded block is not coded in Merge/Skip mode, the Inter-coded block is coded according to Advanced Motion Vector Prediction (AMVP). The MV candidate lists for Merge coded block and AMVP coded block are constructed differently.

In Three-Dimensional Video Coding (3DVC), an inter-view candidate is introduced into the MV candidate list. The inter-view candidate can be inter-view motion prediction or DV prediction depending on the existence condition for Merge coded blocks and depending on the target reference picture for AMVP coded blocks as mentioned before. The inter-view candidate is placed in the first candidate position (i.e., position 0) for Merge coded blocks and the third candidate position (i.e., position 2) for AMVP coded blocks. For AMVP coded blocks, the MV candidate list is constructed in the same way regardless of whether the target reference picture of the current block corresponds to an inter-view reference picture or a temporal reference picture. Similarly, for Merge coded blocks, the MV candidate list is constructed in the same way regardless of whether the inter-view candidate of the current block refers to an inter-view reference picture or a temporal reference picture.

Figure 3A:
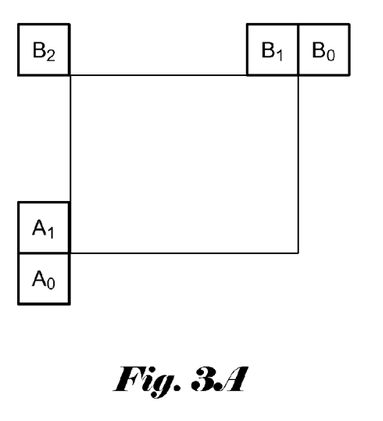
FIG. 3A illustrates spatial neighboring blocks used for deriving candidate members of a motion vector member list for advanced motion vector prediction (AMVP).
Figure 3B:
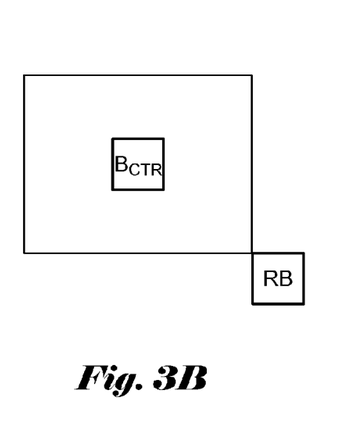
FIG. 3B illustrates temporal neighboring blocks used for deriving candidate members of a motion vector member list for advanced motion vector prediction (AMVP).

For AMVP, the target reference picture is specified explicitly. For MV candidate list constructed for AMVP coded blocks, the DV estimation process is invoked first to find an estimated DV. The AMVP derivation process will fill up the candidate list, where the candidate list includes spatial candidates, temporal candidate and inter-view candidate. The term candidate in this disclosure may refer to DV candidate, MV candidate or MVP candidate. The spatial candidates are derived based on neighboring blocks as shown in FIG. 3A, where neighboring blocks include Above_Left block ($B_2$), Above block ($B_1$), Above_Right block ($B_0$), Left block ($A_1$) and Below_Left block ($A_0$). A spatial candidate is selected among $B_0$-B2 and another spatial candidate is selected from $A_0$ and $A_1$. After spatial MV candidates are derived, the inter-view candidate is checked to determine if it refers to the target reference picture. The temporal candidate is then derived based on temporal neighboring blocks as shown in FIG. 3B, where the temporal neighboring blocks include a collocated center block ($B_{CTR}$) and Right_Bottom block (RB). In HTM, Right_Bottom block (RB) is checked first for the temporal candidate and, if no MV is found, the collocated center block ($B_{CTR}$) is checks.

Figure 3C:
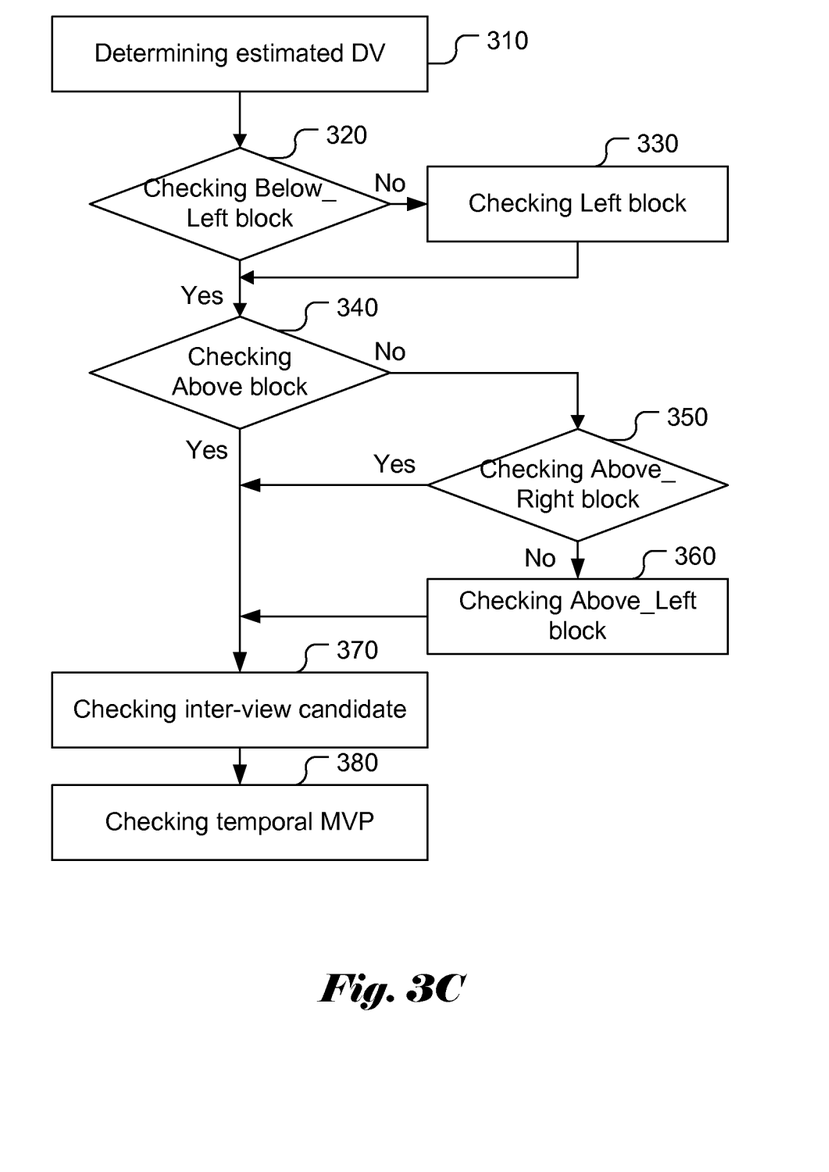
FIG. 3C illustrates an exemplary process for filling up candidate members of a motion vector member list for advanced motion vector prediction (AMVP).

FIG. 3C shows a simplified flowchart of the AMVP candidate list derivation process. An estimated DV is received as a possible inter-view candidate as shown in step 310. The DVs from neighboring blocks are checked in step 320 through step 360 to derive spatial candidates. As shown in step 320, Below_Left block is checked and if an MV is available, the first spatial MV candidate is derived. In this case, the process continues to derive the second spatial MV candidate. Otherwise, Left block is check as shown in step 330. For the second spatial MV candidate, Above block is checked first. If an MV is available, the second spatial MV candidate is derived. Otherwise, the process further checks Above_Right block as shown in step 350. If an MV is available, the second spatial MV is derived. Otherwise, it further checks Above_Left block as shown in step 360. The inter-view candidate is checked to determine whether it refers to the target reference picture as shown in step 370. A temporal candidate is checked in step 380. If the temporal candidate exists, it is added to the MV candidate list for AMVP. The POC scaling checking is omitted in the following discussion. The spatial candidates, temporal candidate and inter-view candidate are all referred as candidate members of the candidate list.

Figure 4:
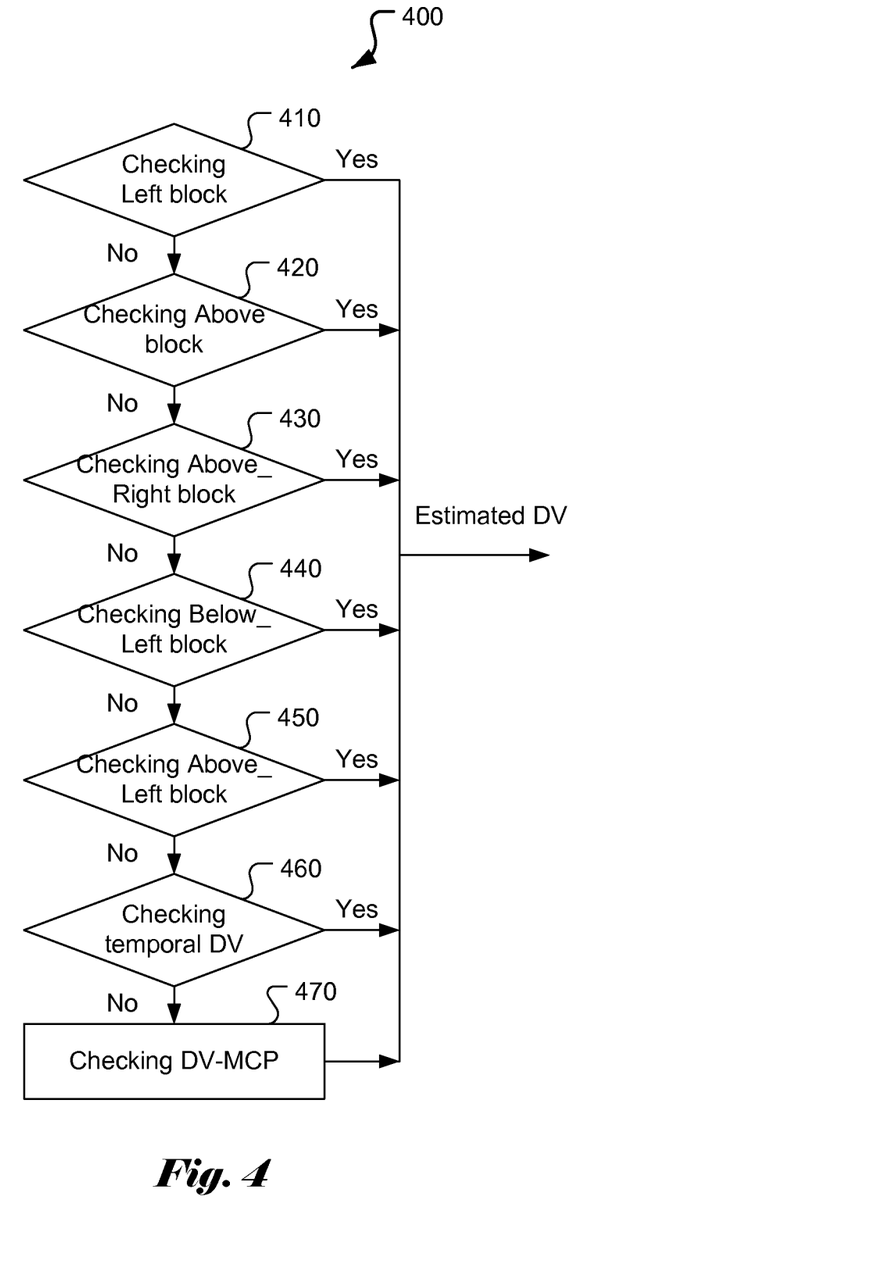
FIG. 4 illustrates an example of derivation process for disparity vector estimation used by advanced motion vector prediction (AMVP) to derive an inter-view candidate.

An exemplary DV estimation process (400) is shown in FIG. 4. Neighboring blocks are checked one by one as shown in steps 410-450 of FIG. 4 to determine whether a DV is available in the neighboring block. Whenever an available DV is found, there is no need to further check the remaining neighboring blocks or to use DV-MCP. The estimated DV is considered as an 'MV's referring to an inter-view reference picture. After spatial neighboring blocks are checked, if no available DV is found, the DV of the temporal neighboring block is checked in step 460 to determine whether a DV is available. DV-MCP method is used to derive an estimated DV if none of the spatial and temporal neighboring blocks has an available DV. In this case, the depth map of the current block is used to derive the estimated DV as shown in step 470.

Figure 5:
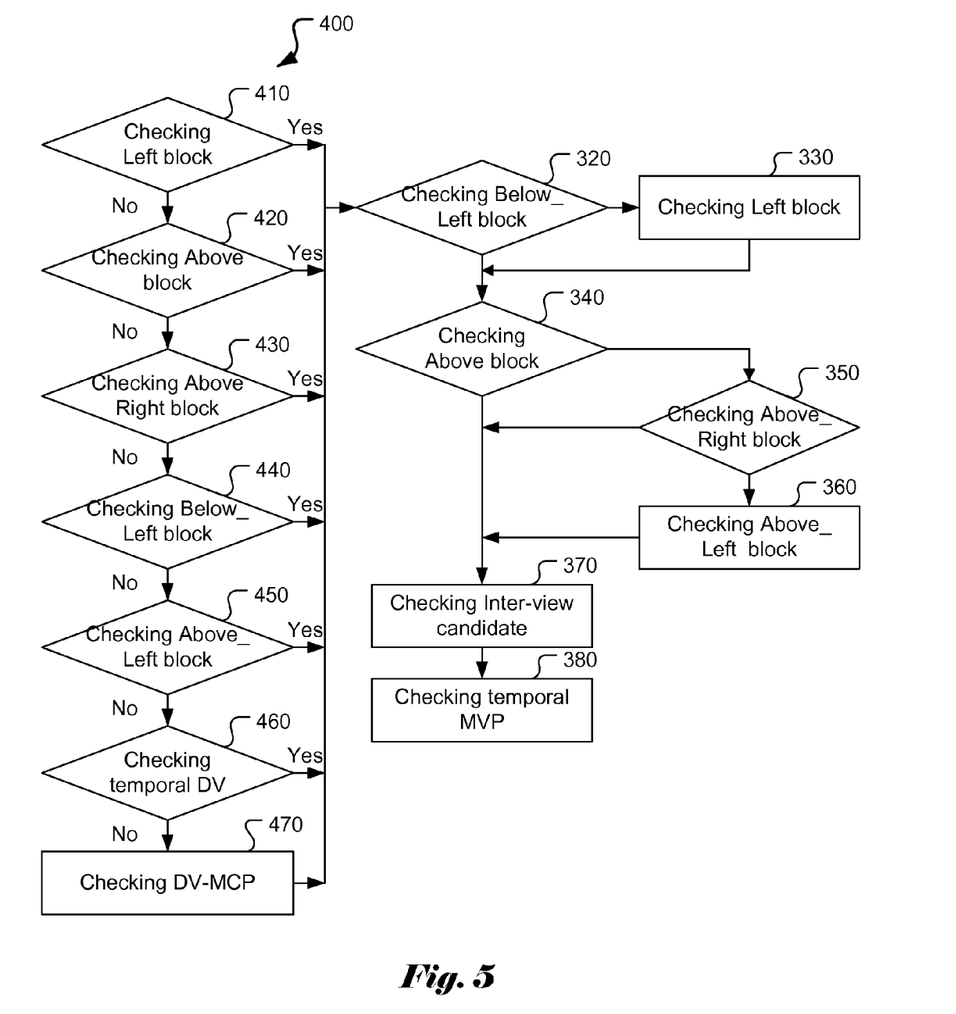
FIG. 5 illustrates exemplary derivation process for an estimated disparity vector and for filling up candidate members of a motion vector member list for advanced motion vector prediction (AMVP).

If the target reference picture determined for an AMVP coded block is an inter-view reference picture, there might be redundancy between the neighboring block checking in the DV estimation process and the AMVP candidate list derivation process. Both processes check the availability of the motion information, where both DV and MV are consider part of motion information associated with a block, among the spatial and temporal neighboring blocks to determine if there is an 'MV' referring to the inter-view reference picture. In the worst case, all the neighboring blocks will be checked for the second time in different orders, as shown in FIG. 5. The estimated DV derivation process (400) will determine the estimated DV. The estimated DV is used during the AMVP candidate list derivation process to fill up the needed candidates in the list. Moreover, the inter-view candidate is used as DVP instead of a candidate for the inter-view motion prediction when the target reference picture is an inter-view reference picture. The inter-view candidate in this case is based on DVs of spatial and temporal neighboring blocks. On the other hand, since the target reference picture is an inter-view reference picture, the spatial and temporal candidates of the MV candidate list for AMVP correspond to DVs of the spatial and temporal neighboring blocks pointing to the inter-view reference picture. Therefore, the inter-view candidate and spatial/temporal candidates are derived based on the same motion information. Therefore, the inter-view candidate in this case may not be efficient.

Another issue with the conventional 3D video coding as described in the conventional HTM is related to the candidate list derivation for Merge mode. In Merge mode, inter-view candidate is placed in the first candidate position in the candidate list. As mentioned before, the inter-view candidate can be used in the inter-view motion prediction or used for DVP, depending on the existence condition. In inter-view motion prediction, the inter-view candidate refers to a temporal reference picture. In the case of DVP, the DVP refers to an inter-view reference picture. It may not be efficient to place the inter-view candidate at the first candidate position when the inter-view candidate is used as DVP.

SUMMARY OF THE INVENTION

A method and apparatus for three-dimensional video coding and multi-view video coding are disclosed. Embodiments according to the present invention construct a motion vector (MV) or disparity vector (DV) candidate list for a block coded in the advanced motion vector prediction (AMVP) mode or Merge mode. A first candidate referring to a reference picture corresponding to an inter-view reference picture is derived. A second candidate referring to a reference picture corresponding to a non-inter-view reference picture is derived. An AMVP candidate list is constructed accordingly that comprises at least the first candidate and the second candidate, wherein the first candidate is set to a lower priority position in the AMVP candidate list than the second candidate. Three-dimensional or multi-view video encoding or decoding is applied to the input data associated with the current block using the AMVP candidate list if the current block is coded with AMVP mode.

In the first candidate derivation process, an estimated disparity vector (DV) from neighboring disparity vectors (DVs) associated with neighboring blocks of the current block is derived, wherein the estimated DV is used to derive the first candidate. The estimated DV can be derived from the first available DV among the neighboring DVs. In one embodiment, candidate members of the AMVP candidate list are also generated during the process of generating the estimated DV. In this case, each of the neighboring motion information associated with one neighboring block is searched at most once. In yet another embodiment, the second candidate is an inter-view candidate and is placed in the first candidate position. In the process of deriving the estimated DV, the first candidate will not be included in the AMVP candidate list or a default non-zero DV is used as the estimated DV if the estimated DV is not available. Information associated with the default non-zero DV can be signaled in a bitstream generated by the three-dimensional video coding or the multi-view video coding. Furthermore, the information associated with the default non-zero DV can be signaled in the bitstream for a sequence, picture, or a slice or region of the picture.

Embodiments according to the present invention construct a Merge candidate list for a current block coded in Merge mode. A first candidate referring to a reference picture corresponding to an inter-view reference picture is derived. A second candidate referring to a reference picture corresponding to non-inter-view reference picture is derived. A Merge candidate list is constructed to comprise at least the first candidate and second candidate, wherein the first candidate is set to a lower priority position in the Merge candidate list than the second candidate. Three-dimensional or multi-view video encoding or decoding is applied to the input data associated with the current block using the Merge candidate list. In one embodiment, the first candidate in the Merge candidate list is placed at a selected candidate position. For example, the first candidate in the Merge candidate list can be placed at the fourth candidate position. The first candidate in the Merge candidate list may correspond to disparity vector prediction and the second candidate in the Merge candidate list may correspond to temporal motion prediction or inter-view motion prediction. The second candidate can be placed at the first position of the Merge candidate list if corresponding to inter-view motion prediction.

DETAILED DESCRIPTION

As described above, there are various issues with the candidate derivation in three-dimensional (3D) video coding based on the conventional High Efficiency Video Coding (HEVC) based Test Model (HTM). Embodiments of the present invention derive candidate list for advanced motion vector prediction (AMVP) coded blocks depending on whether the target reference picture is an inter-view reference picture. Embodiments of the present invention also derive candidate list for Merge coded blocks depending on whether the inter-view candidate refers to an inter-view reference picture.

As mentioned before, in the current estimated DV derivation process, a zero DV is used if neither the DV from neighboring blocks nor the DV from DV-MCP derivation process is available. A zero DV between two inter-view pictures implies that two corresponding cameras are at the same location or the two cameras are at an infinite distance. Apparently, the zero DV is not a good default value. Accordingly, an embodiment according to the present invention will forbid setting the DV to be zero if neither the DV from neighboring blocks nor the DV from DV-MCP derivation process is available. Instead, an embodiment according to the present invention will not use the inter-view candidate in this case. When the inter-view candidate is declared as unavailable instead of using a default zero DV, it will provide an opportunity for additional candidate to be selected. Another way to overcome the issue with the default zero-DV is to use a global DV or a default non-zero DV, which can be transmitted in the bitstream. And this global DV or non-zero DV will be treated as the default estimated DV when the DV estimation process fails. The global DV may correspond to typical average DV.

The performance of a system incorporating an embodiment of the present invention is compared with the conventional 3D video coding. If neither the DV from neighboring blocks nor the DV from DV-MCP derivation process is available, the conventional 3D video coding uses a default zero DV while the system incorporating an embodiment of the present invention forbids the use of a default zero DV. The system incorporating an embodiment of the present invention achieves slightly better performance in terms of BD-Rate (0% to 0.1%) for various test video materials, where the BD-rate is a commonly used performance measurement in the field of video coding. The required processing times for encoding, decoding and rendering (i.e., view synthesis) show noticeable improvement (reduction of processing times by 4%, 3.1% and 5.4% respectively).

Figure 6:
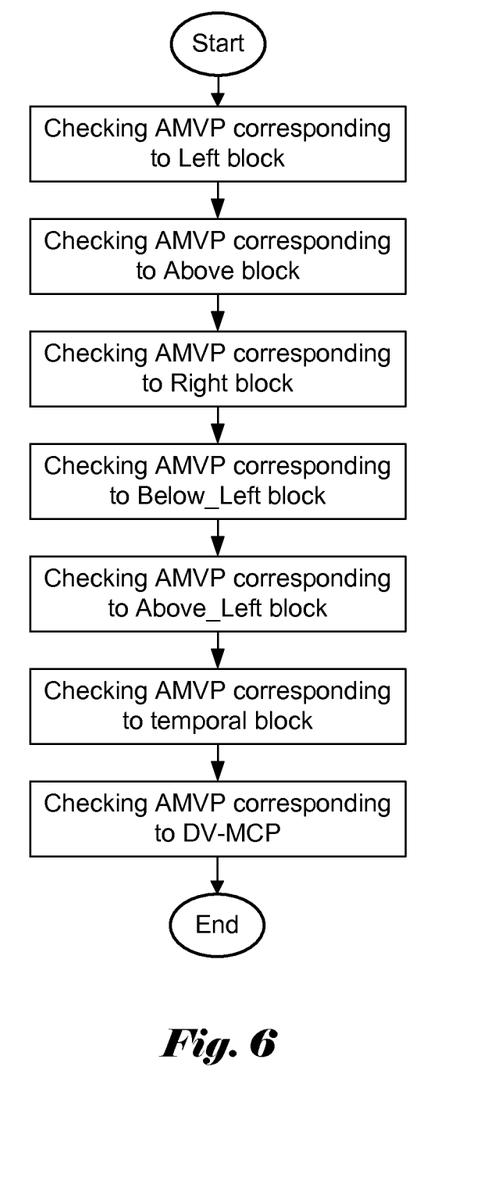
FIG. 6 illustrates an example of single derivation process for both estimated disparity vector and filling up candidate members of a motion vector member list for advanced motion vector prediction (AMVP).

Regarding the AMVP candidate derivation, there might be redundancy between the neighboring block checking in the DV estimation process and the AMVP candidate list derivation process as mentioned before. An embodiment according to the present invention solves the redundant processing issue by using the DV estimation process to fill up the MV or DV candidate list when the target reference picture is an inter-view reference picture. Therefore, the DV estimation process in this case will not return the first found neighboring DV as before. FIG. 6 illustrates an exemplary flowchart for an AMVP candidate derivation process incorporating an embodiment of the present invention. The AMVP candidate derivation process incorporating an embodiment of the present invention has several benefits over the conventional approach. In addition to the benefit of avoiding redundancy in checking the motion information (i.e, DVs and MVs) of neighboring blocks, the inefficient DV candidate with a zero vertical component is also removed. Furthermore, DV-MCP can be used as an AMVP candidate, which may result in more coding gain. For example, if only the Above-Left neighboring block has a DV and the DV value is (dx,dy), then there will be only two non-zero candidates: (dx,dy) and (dx, 0) according to the conventional HTM. However, the candidate list derivation according to the present invention, will remove (dx, 0) due to its redundancy. Therefore, one or more DV-MCP candidates may be added into the candidates list. This would provide opportunity to derive candidates that can be more reasonable and efficient since some redundant candidates would be eliminated during checking the DVs of the neighboring blocks.

If the target reference picture is not an inter-view reference picture (referred as a non-inter-view reference picture), i.e. the reference picture is a temporal reference picture, the AMVP candidate list derivation process places the inter-view candidate at the first candidate position in the candidate list according to an embodiment of the present invention. The rationale behind this embodiment is that the inter-view candidate in this case is likely more efficient than DVP as being used in the conventional 3D-AVC (3D Advanced Video Coding).

The performance of a system incorporating an embodiment of the present invention as described above is compared with the conventional 3D video coding. The system incorporating an embodiment of the present invention uses the DV estimation process to fill up the MV or DV candidate list when the target reference picture is an inter-view reference picture. The system incorporating an embodiment of the present invention achieves slightly better performance in terms of BD-Rate (0% to 0.2%) for various test video materials. The required processing times for encoding, decoding and rendering show noticeable improvement (reduction of processing times by 5.6%, 6.7% and 5.9% respectively).

For a block coded in AMVP mode, the DV estimation process may also forbid the use of a default zero DV when the DV estimation process fails to find an available DV.

For Merge mode, an embodiment of the present invention changes the inter-view candidate position in the candidate list when the inter-view candidate refers to an inter-view reference picture. When the inter-view candidate refers to an inter-view reference picture, the inter-view candidate actually is used for DVP. In this case, the inter-view candidate is likely not a good choice. However, according to the conventional candidate derivation process, the inter-view candidate is placed at the first candidate position (i.e., the highest priority). Accordingly, an embodiment of the present invention for candidate list derivation for Merge mode places the inter-view candidate at the fourth candidate position when the inter-view candidate refers to an inter-view reference picture. While the fourth candidate position is used as an example to lower the priority of the inter-view candidate in the candidate list, other lower-priority candidate position may also be used. When the inter-view candidate refers to a temporal reference picture, the inter-view motion prediction is carried out. In this case, it is reasonable to keep the inter-view candidate at the first candidate position.

The performance of a system incorporating an embodiment of the present invention as described above is compared with the conventional 3D video coding. The system incorporating an embodiment of the present invention places the inter-view candidate at the fourth candidate position when the inter-view candidate refers to an inter-view reference picture, while the system leaves the inter-view candidate at the first candidate position when the inter-view candidate refers to a temporal reference picture. The system incorporating an embodiment of the present invention achieves slightly better performance in terms of BD-Rate (0% to 0.2%) for various test video materials. The required processing times for encoding, decoding and rendering (i.e., view synthesis) show noticeable improvement (reduction of processing times by 0.3%, 5.3% and 1.8% respectively).

A system according to the present invention may also combine the techniques disclosed above. For example, a system may incorporate the DV estimation process forbidding a default zero DV when the DV estimation process fails to find an available DC, the AMVP candidate list derivation process using the DV estimation process to fill up the candidate list when the target reference picture corresponds to an inter-view reference picture, and the candidate list derivation process for Merge mode that places the inter-view candidate in the fourth position in the candidate list if the inter-view candidate refers to an inter-view reference picture. The performance of the system using the combined technique is compared with a conventional system. The system incorporating an embodiment of the present invention achieves better performance in terms of BD-Rate (0% to 0.5%) for various test video materials. Also, the required processing times for encoding, decoding and rendering (i.e., view synthesis) show noticeable improvement (reduction of processing times by 2.8%, 6.7% and 5.1% respectively).

Figure 7:
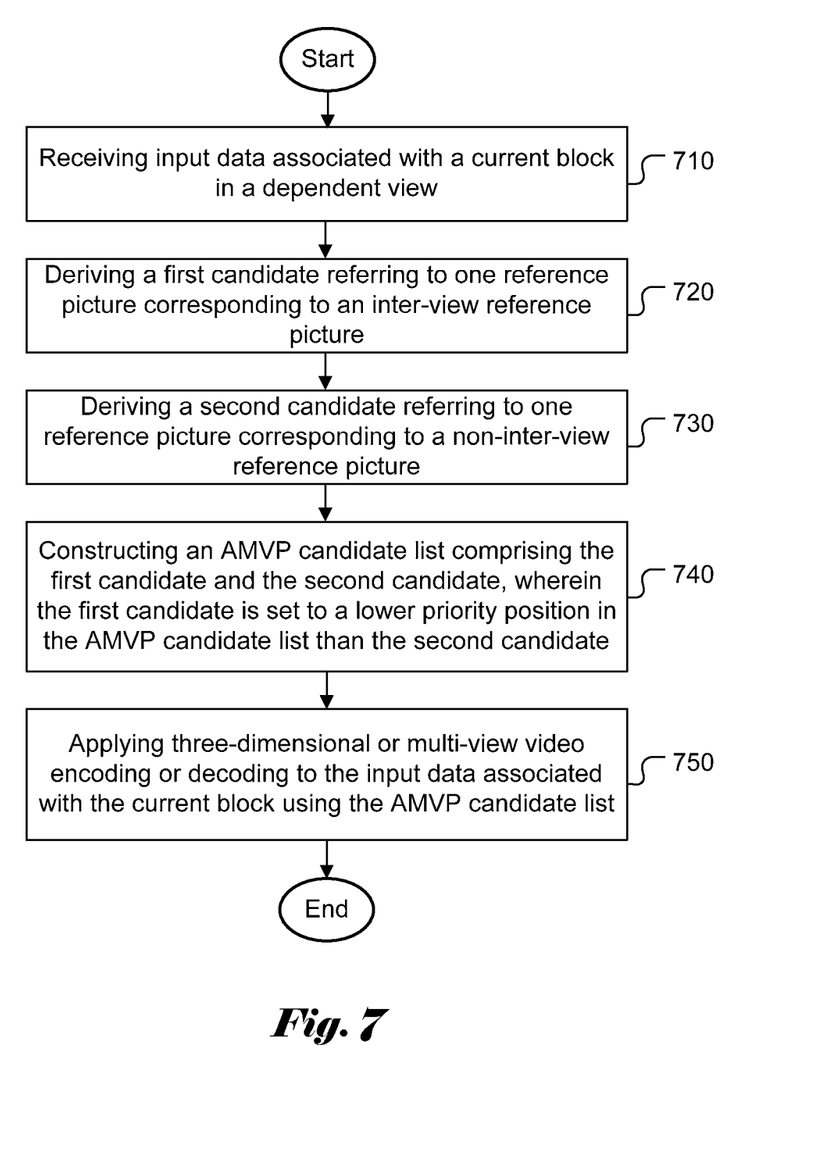
FIG. 7 illustrates an exemplary flowchart of a three-dimensional or multi-view coding incorporating candidate list construction for advanced motion vector prediction (AMVP) based on an embodiment of the present invention.

FIG. 7 illustrates an exemplary flowchart of a three-dimensional/multi-view encoding or decoding system incorporating an MV or DV candidate list construction process according to an embodiment of the present invention for a current block coded in the advanced motion vector prediction (AMVP) mode. The system receives input data associated with a current block in a dependent view as shown in step 710. For encoding, the input data associated with the current block corresponds to original pixel data, depth data, or other information associated with the current block (e.g., motion vector, disparity vector, motion vector difference, or disparity vector difference) to be coded. For decoding, the input data corresponds to the coded data associated with the current block in the dependent view. The input data may be retrieved from storage such as a computer memory, buffer (RAM or DRAM) or other media. The input data may also be received from a processor such as a controller, a central processing unit, a digital signal processor or electronic circuits that produce the input data. A first candidate referring to a reference picture corresponding to an inter-view reference picture is derived as shown in step 720. A second candidate referring to a reference picture corresponding to a non-inter-view reference picture is derived as shown in step 730. An AMVP candidate list comprising the first candidate and the second candidate is constructed, wherein the first candidate is set to a lower priority position in the AMVP candidate list than the second candidate as shown I step 740. Three-dimensional or multi-view video encoding or decoding is then applied to the input data associated with the current block using the AMVP candidate list as shown in step 7450.

Figure 8:
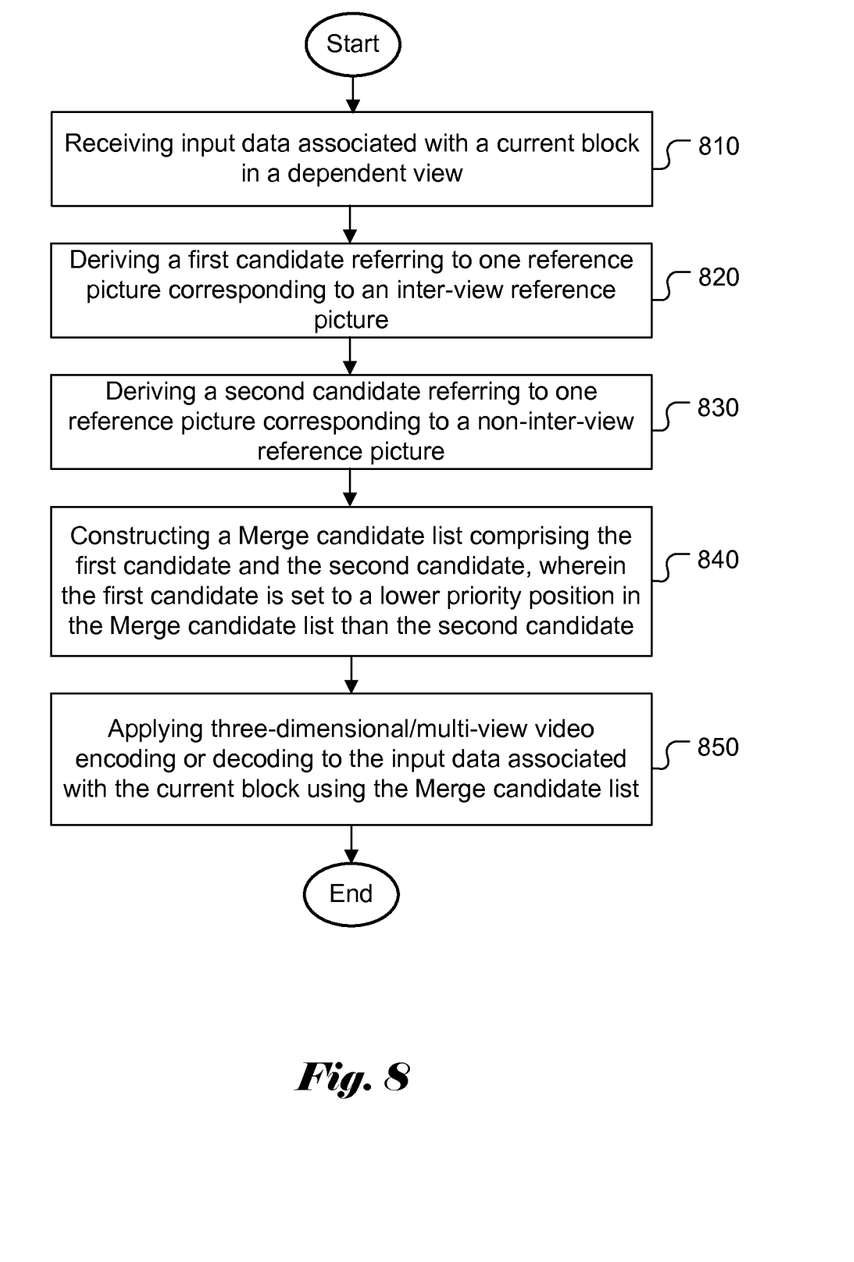
FIG. 8 illustrates an exemplary flowchart of a three-dimensional or multi-view coding incorporating candidate list construction for Merge mode based on an embodiment of the present invention.

FIG. 8 illustrates an exemplary flowchart of a three-dimensional/multi-view encoding or decoding system incorporating an MV or DV candidate list construction process according to an embodiment of the present invention for a current block coded in Merge mode. The system receives input data associated with a current block in a dependent view as shown in step 810. A first candidate referring to one reference picture corresponding to an inter-view reference picture is derived as shown in step 820. A second candidate referring to one reference picture corresponding to a non-inter-view reference picture is derived as shown in step 830. A Merge candidate list comprising the first candidate and the second candidate is constructed as shown in step 840, wherein the first candidate is set to a lower priority position in the Merge candidate list than the second candidate. Three-dimensional or multi-view video encoding or decoding is then applied to the input data associated with the current block using the Merge candidate list as shown in step 850.

The flowcharts shown above are intended to illustrate examples of constructing MV or DV candidate list depending on whether the target reference picture is an inter-view reference picture or whether the inter-view candidate refers to an inter-view reference picture. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional video coding and multi-view video coding, the method comprising:
   receiving input data associated with a current block in a dependent view, wherein Advanced Motion Vector Prediction (AMVP) mode is selected for the current block;
   deriving a first candidate referring to one reference picture corresponding to an inter-view reference picture, wherein said deriving the first candidate comprises deriving an estimated disparity vector (DV) from neighboring disparity vectors (DVs) associated with neighboring blocks of the current block, and wherein if the estimated DV is not available, a default non-zero DV is used as the estimated DV;
   deriving a second candidate referring to one reference picture corresponding to a non-inter-view reference picture,
   constructing an AMVP candidate list comprising the first candidate and the second candidate, wherein the first candidate is set to a lower priority position in the AMVP candidate list than the second candidate; and
   applying three-dimensional or multi-view video encoding or decoding to the input data associated with the current block using the AMVP candidate list.

2. The method of claim 1, wherein said deriving the estimated DV generates the estimated DV by searching through the neighboring DVs associated with the neighboring blocks of the current block and selects a first available DV as the estimated DV.

3. The method of claim 1, wherein said deriving the estimated DV generates the estimated DV and also generates candidate members of the AMVP candidate list by searching through neighboring motion information associated with the neighboring blocks of the current block.

4. The method of claim 3, wherein each of the neighboring motion information associated with one neighboring block is searched at most once.

5. The method of claim 1, wherein information associated with the default non-zero DV is signaled in a bitstream generated by the three-dimensional video coding or the multi-view video coding.

6. The method of claim 5, wherein the information associated with the default non-zero DV is signaled in the bitstream for a sequence, picture, or a slice or region of the picture.

7. The method of claim 1, wherein the second candidate comprises a motion vector (MV) associated with a corresponding block in a reference view derived from a disparity vector (DV), and the second candidate is placed at first position in the AMVP candidate list.

8. An apparatus for three-dimensional and multi-view video coding, comprising:
   one or more electronic circuits, wherein said one or more electronic circuits are configured to:
      receive input data associated with a current block in a dependent view;

derive a first candidate referring to one reference picture corresponding to an inter-view reference picture, wherein said deriving the first candidate comprises deriving an estimated disparity vector (DV) from neighboring disparity vectors (DVs) associated with neighboring blocks of the current block, and wherein if the estimated DV is not available, a default non-zero DV is used as the estimated DV;

derive a second candidate referring to one reference picture corresponds to a non-inter-view reference picture;

construct a AMVP candidate list comprising the first candidate and the second candidates, wherein the first candidate is set to a lower priority position in the AMVP candidate list than the second candidate; and apply three-dimensional/multi-view video encoding or decoding to the input data associated with the current block using the AMVP candidate list.

\* \* \* \* \*